(12) United States Patent
Yu

(10) Patent No.: US 11,184,281 B2
(45) Date of Patent: *Nov. 23, 2021

(54) PACKET PROCESSING METHOD AND APPARATUS

(71) Applicant: Huawei Technologies Co., Ltd., Shenzhen (CN)

(72) Inventor: Jingzhou Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/831,406

(22) Filed: Mar. 26, 2020

(65) Prior Publication Data
US 2020/0228448 A1 Jul. 16, 2020

Related U.S. Application Data

(63) Continuation of application No. 15/940,579, filed on Mar. 29, 2018, now Pat. No. 10,630,584, which is a
(Continued)

(30) Foreign Application Priority Data

Sep. 30, 2015 (CN) .......................... 201510646225.9

(51) Int. Cl.
H04L 12/741 (2013.01)
H04L 12/721 (2013.01)
H04L 29/06 (2006.01)

(52) U.S. Cl.
CPC .............. H04L 45/74 (2013.01); H04L 45/38 (2013.01); H04L 69/22 (2013.01)

(58) Field of Classification Search
None
See application file for complete search history.

(56) References Cited

U.S. PATENT DOCUMENTS 5,815,698 A * 9/1998 Holmann ............ G06F 9/30058
712/237
8,599,858 B1 12/2013 Mizrahi
(Continued)

FOREIGN PATENT DOCUMENTS

CN 1659494 A 8/2005
CN 1858705 A 11/2006
(Continued)

OTHER PUBLICATIONS

U.S. Appl. No. 15/940,579, filed Mar. 29, 2018.
(Continued)

Primary Examiner — Lonnie V Sweet
(74) Attorney, Agent, or Firm — Leydig, Voit & Mayer, Ltd.

(57) ABSTRACT

A packet processing method and apparatus relating to the field of communications technologies are provided, so as to reduce overheads and improve update efficiency. The method includes: receiving a first packet and a second packet; determining a first instruction block; obtaining a first identifier according to the first instruction block and the first packet, and obtaining a second identifier according to the first instruction block and the second packet, the first entry includes a third identifier, and the third identifier is a storage address of a second instruction block; obtaining the third identifier by accessing the first entry indicated by the first identifier, and obtaining the third identifier by accessing the first entry indicated by the second identifier; obtaining the second instruction block according to the third identifier; and processing the first packet and the second packet according to the second instruction block.

15 Claims, 3 Drawing Sheets

Related U.S. Application Data continuation of application No. PCT/CN2016/080176, filed on Apr. 25, 2016.

(56) References Cited

U.S. PATENT DOCUMENTS

| | | | |
|---|---|---|---|
| 10,630,584 B2* | 4/2020 | Yu | H04L 45/38 |
| 2003/0196096 A1 | 10/2003 | Sutton | |
| 2006/0136608 A1 | 6/2006 | Gilbert et al. | |
| 2008/0189514 A1 | 8/2008 | McConnell | |
| 2013/0163427 A1* | 6/2013 | Beliveau | H04L 69/22 370/235 |
| 2016/0226768 A1* | 8/2016 | Liu | H04L 45/64 |
| 2016/0277297 A1 | 9/2016 | Chang | |
| 2016/0308759 A1 | 10/2016 | Feng et al. | |

FOREIGN PATENT DOCUMENTS

| | | |
|---|---|---|
| CN | 101075966 A | 11/2007 |
| CN | 101133409 A | 2/2008 |
| CN | 101335644 A | 12/2008 |
| CN | 101349973 A | 1/2009 |
| CN | 100511175 C | 7/2009 |
| CN | 100585554 C | 1/2010 |
| CN | 103905310 A | 7/2014 |
| CN | 103986660 A | 8/2014 |
| CN | 104205745 A | 12/2014 |
| CN | 104580027 A | 4/2015 |
| EP | 3079318 A1 | 10/2016 |
| WO | 2015101113 A1 | 7/2015 |
| WO | 2015101119 A1 | 7/2015 |

OTHER PUBLICATIONS

"OpenFlow Switch Specification," ONF TS-012, Version 1.4.0 (Wire Protocol 0x05), Open Networking Foundation (Oct. 14, 2013).

"OpenFlow Switch Specification" ONF-TS-023, Version 1.3.5 ( Protocol version 0x04 ), Open Networking Foundation (Mar. 26, 2015).

Song et al., "Unified POF Programming for Diversified SDN Data Plane," Huawei Technologies, pp. 1-6, Santa Clara, California (May 1, 2014).

Song, "Protocol-Oblivious Forwarding: Unleash the Power of SDN through a Future-Proof Forwarding Plane," Hot Topics in Software Defined Networking, ACM SIGCOMM, pp. 127-132, Hong Kong, China (Aug. 16, 2013).

"OF-PI: A Protocol Independent Layer," ONF TR-505, Version 1.1, Open Networking Foundation, pp. 1-24, Palo Alto, California (Sep. 5, 2014).

Bosshart et al. "Public Review for Programming Protocol-Independent Packet Processors", ACM SIGCOMM Computer Communication Review, vol. 44, No. 3, pp. 87-95, Jul. 8, 2014, New York, New York (Jul. 3, 2014).

Yu et al., "Forwarding Programming in Protocol-Oblivious Instruction Set," IEEE 22nd International Conference on Network Protocols, 577-582, Institute of Electrical and Electronics Engineers, New York, New York (Oct. 21, 2014).

* cited by examiner

PACKET PROCESSING METHOD AND APPARATUS

CROSS-REFERENCE TO RELATED APPLICATIONS

This application is a continuation of U.S. patent application Ser. No. 15/940,579, filed on Mar. 29, 2018, which is a continuation of International Application No. PCT/CN2016/080176, filed on Apr. 25, 2016. The International Application claims priority to Chinese Patent Application No. 201510646225.9, filed on Sep. 30, 2015. All of the aforementioned patent applications are hereby incorporated by reference in their entireties.

TECHNICAL FIELD

Embodiments of the present invention relate to the communications field, and in particular, to a packet processing method and apparatus.

BACKGROUND

In an OpenFlow technology, separation between forwarding and control is implemented, and packet forwarding may be controlled by means of programming on a controller. In the OpenFlow technology, a pipeline including a multi-level flow table is used to perform packet forwarding processing. For the OpenFlow technology, refer to OpenFlow Switch Specification version 1.4.0.

When a packet processing apparatus processes a packet, a procedure of processing the packet may relate to multiple instruction blocks. For example, the packet processing apparatus obtains an identifier of a next instruction block according to a current instruction block. The packet processing apparatus processes the packet according to the next instruction block indicated by the identifier of the next instruction block.

A procedure of processing different packets may relate to a same current instruction block and a same next instruction block. The packet processing apparatus may need to store multiple identifiers of the next instruction block. After a storage location of the next instruction block changes, the packet processing apparatus needs to update the multiple identifiers of the next instruction block, and overheads are relatively high.

For example, a current instruction block corresponding to a packet 1 is an instruction block 1, and a next instruction block corresponding to the packet 1 is an instruction block 2. A current instruction block corresponding to a packet 2 is the instruction block 1, and a next instruction block corresponding to the packet 2 is the instruction block 2. A procedure in which the packet processing apparatus processes the packet 1 includes: obtaining an identifier of the instruction block 2 according to the instruction block 1, and processing the packet 1 according to the instruction block 2 corresponding to the identifier of the instruction block 2. A procedure in which the packet processing apparatus processes the packet 2 includes: obtaining an identifier of the instruction block 2 according to the instruction block 1, and processing the packet 2 according to the instruction block 2 corresponding to the identifier of the instruction block 2. The packet processing apparatus needs to store the identifier of the instruction block 2 related to the procedure of processing the packet 1, and the packet processing apparatus also needs to store the identifier of the instruction block 2 related to the procedure of processing the packet 2. That is, the packet processing apparatus needs to store two identifiers of the instruction block 2. If a storage location of the instruction block 2 changes, the packet processing apparatus needs to update the two identifiers of the instruction block 2, and overheads are relatively high.

SUMMARY

Embodiments of the present invention provide a packet processing method and apparatus, so as to resolve a problem that after a storage location of an instruction block changes, the packet processing apparatus needs to update multiple identifiers of the instruction block, and overheads are relatively high.

To achieve the foregoing objective, the following technical solutions are used in the embodiments of the present invention.

According to a first aspect, an embodiment of the present invention provides a packet processing method, where the method includes:

receiving, by a packet processing apparatus, a first packet and a second packet;

determining, by the packet processing apparatus, a first instruction block corresponding to the first packet and the second packet;

obtaining, by the packet processing apparatus, a first identifier according to the first instruction block and the first packet, and obtaining a second identifier according to the first instruction block and the second packet, where the first identifier is used to indicate a first entry, the second identifier is used to indicate the first entry, the first entry includes a third identifier, and the third identifier is a storage address of a second instruction block;

obtaining, by the packet processing apparatus, the third identifier by accessing the first entry indicated by the first identifier, and obtaining the third identifier by accessing the first entry indicated by the second identifier;

obtaining, by the packet processing apparatus, the second instruction block according to the third identifier; and processing, by the packet processing apparatus, the first packet and the second packet according to the second instruction block.

In a first possible implementation of the first aspect, the obtaining, by the packet processing apparatus, a first identifier according to the first instruction block and the first packet includes:

obtaining, by the packet processing apparatus and from the first instruction block, a first jump instruction according to the first packet, where the first identifier is a storage address of the first entry, the first instruction block includes the first jump instruction, the first jump instruction includes an operation code and an operand, and the first identifier is the operand; and the obtaining, by the packet processing apparatus, the third identifier by accessing the first entry indicated by the first identifier includes:

accessing, by the packet processing apparatus, the first entry by executing the first jump instruction; and obtaining, by the packet processing apparatus, the third identifier from the first entry.

In a second possible implementation of the first aspect, the obtaining, by the packet processing apparatus, a first identifier according to the first instruction block and the first packet includes:

obtaining, by the packet processing apparatus and from the first packet, a search key according to the first instruction block;

obtaining, by the packet processing apparatus, an identifier of a first flow table according to the first instruction block;

searching, by the packet processing apparatus, the first flow table indicated by the identifier of the first flow table for a flow table entry that matches the search key, where the flow table entry includes the first identifier; and obtaining, by the packet processing apparatus, the first identifier from the flow table entry.

With reference to any one of the first aspect, or the first to the second possible implementations of the first aspect, in a third possible implementation of the first aspect, the packet processing method further includes:

deleting, by the packet processing apparatus, the second instruction block;

setting, by the packet processing apparatus, the third identifier in the first entry to be invalid; and deleting, by the packet processing apparatus, the third identifier in the first entry; or when a storage location of the second instruction block is adjusted from a first location to a second location, replacing, by the packet processing apparatus, the third identifier in the first entry with a fourth identifier, where the first location is corresponding to the third identifier, and the second location is corresponding to the fourth identifier.

With reference to any one of the first aspect, or the first to the third possible implementations of the first aspect, in a fourth possible implementation of the first aspect, the first instruction block is an instruction block defined by a user, and before the determining, by the packet processing apparatus, a first instruction block corresponding to the first packet, the method further includes:

obtaining, by the packet processing apparatus, a fifth identifier according to a third instruction block, where the fifth identifier is used to indicate a second entry; and accessing, by the packet processing apparatus, the second entry according to the fifth identifier, where the second entry includes a sixth identifier, and the sixth identifier is a storage address of the first instruction block; and the determining, by the packet processing apparatus, a first instruction block corresponding to the first packet includes:

determining, by the packet processing apparatus, the first instruction block according to the sixth identifier in the second entry.

According to a second aspect, an embodiment of the present invention provides a packet processing apparatus, where the apparatus includes a receiving unit, a determining unit, an obtaining unit, and a processing unit, and the receiving unit is configured to receive a first packet and a second packet;

the determining unit is configured to determine a first instruction block corresponding to the first packet and the second packet that are received by the receiving unit;

the obtaining unit is configured to: obtain a first identifier according to the first instruction block determined by the determining unit and the first packet received by the receiving unit, and obtain a second identifier according to the first instruction block determined by the determining unit and the second packet received by the receiving unit, where the first identifier is used to indicate a first entry, the second identifier is used to indicate the first entry, the first entry includes a third identifier, and the third identifier is a storage address of a second instruction block;

the obtaining unit is further configured to: obtain the third identifier by accessing the first entry indicated by the first identifier, and obtain the third identifier by accessing the first entry indicated by the second identifier;

the obtaining unit is further configured to obtain the second instruction block according to the third identifier; and the processing unit is configured to process, according to the second instruction block obtained by the obtaining unit, the first packet and the second packet that are received by the receiving unit.

In a first possible implementation of the second aspect, the obtaining unit is configured to:

obtain, from the first instruction block determined by the determining unit, a first jump instruction according to the first packet received by the receiving unit, where the first identifier is a storage address of the first entry, the first instruction block includes the first jump instruction, the first jump instruction includes an operation code and an operand, and the first identifier is the operand;

access the first entry by executing the first jump instruction; and obtain the third identifier from the first entry.

In a second possible implementation of the second aspect, the obtaining unit is configured to:

obtain, from the first packet, a search key according to the first instruction block;

obtain an identifier of a first flow table according to the first instruction block;

search the first flow table indicated by the identifier of the first flow table for a flow table entry that matches the search key, where the flow table entry includes the first identifier; and obtain the first identifier from the flow table entry.

With reference to any one of the second aspect, or the first to the second possible implementations of the second aspect, in a third possible implementation of the second aspect, the processing unit is further configured to:

delete the second instruction block;

set the third identifier in the first entry to be invalid; and delete the third identifier in the first entry; or when a storage location of the second instruction block is adjusted from a first location to a second location, replace the third identifier in the first entry with a fourth identifier, where the first location is corresponding to the third identifier, and the second location is corresponding to the fourth identifier.

With reference to any one of the second aspect, or the first to the third possible implementations of the second aspect, in a fourth possible implementation of the second aspect, the first instruction block is an instruction block defined by a user; and the obtaining unit is further configured to:

before the determining unit determines the first instruction block corresponding to the first packet, obtain a fifth identifier according to a third instruction block, where the fifth identifier is used to indicate a second entry; and access the second entry according to the fifth identifier, where the second entry includes a sixth identifier, and the sixth identifier is a storage address of the first instruction block; and the determining unit is configured to determine the first instruction block according to the sixth identifier in the second entry accessed by the obtaining unit.

According to the foregoing technical solutions, the packet processing apparatus receives the first packet and the second packet, determines the first instruction block corresponding to the first packet and the second packet, obtains the first identifier according to the first instruction block and the first packet, and obtains the second identifier according to the first instruction block and the second packet, where the first identifier is used to indicate the first entry, the second identifier is used to indicate the first entry, the first entry includes the third identifier, and the third identifier is the storage address of the second instruction block. The packet processing apparatus obtains the third identifier by accessing the first entry indicated by the first identifier, and obtains the third identifier by accessing the first entry indicated by the second identifier. The packet processing apparatus obtains the second instruction block according to the third identifier, and processes the first packet and the second packet according to the second instruction block.

In the foregoing technical solutions, a packet processing apparatus accesses a first entry according to a first identifier, and accesses the first entry according to a second identifier. The first entry includes a third identifier, and the third identifier is a storage address of a second instruction block; that is, the storage address of the second instruction block is stored in the first entry. Therefore, the packet processing apparatus can obtain the second instruction block according to the third identifier, and process a first packet and a second packet according to the second instruction block. If a storage location of the second instruction block changes, the packet processing apparatus needs to update only the third identifier stored in the first entry to obtain the second instruction block whose storage location has changed. In the conventional art, the packet processing apparatus stores multiple identifiers, and the multiple identifiers are all used to identify a same instruction block. When a storage location of the same instruction block changes, the packet processing apparatus needs to update the multiple identifiers. Therefore, in the foregoing technical solutions, the packet processing apparatus needs to update the third identifier in the first entry instead of updating the multiple identifiers, so as to help reduce overheads and improve update efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention.

DESCRIPTION OF EMBODIMENTS

Figure 1:
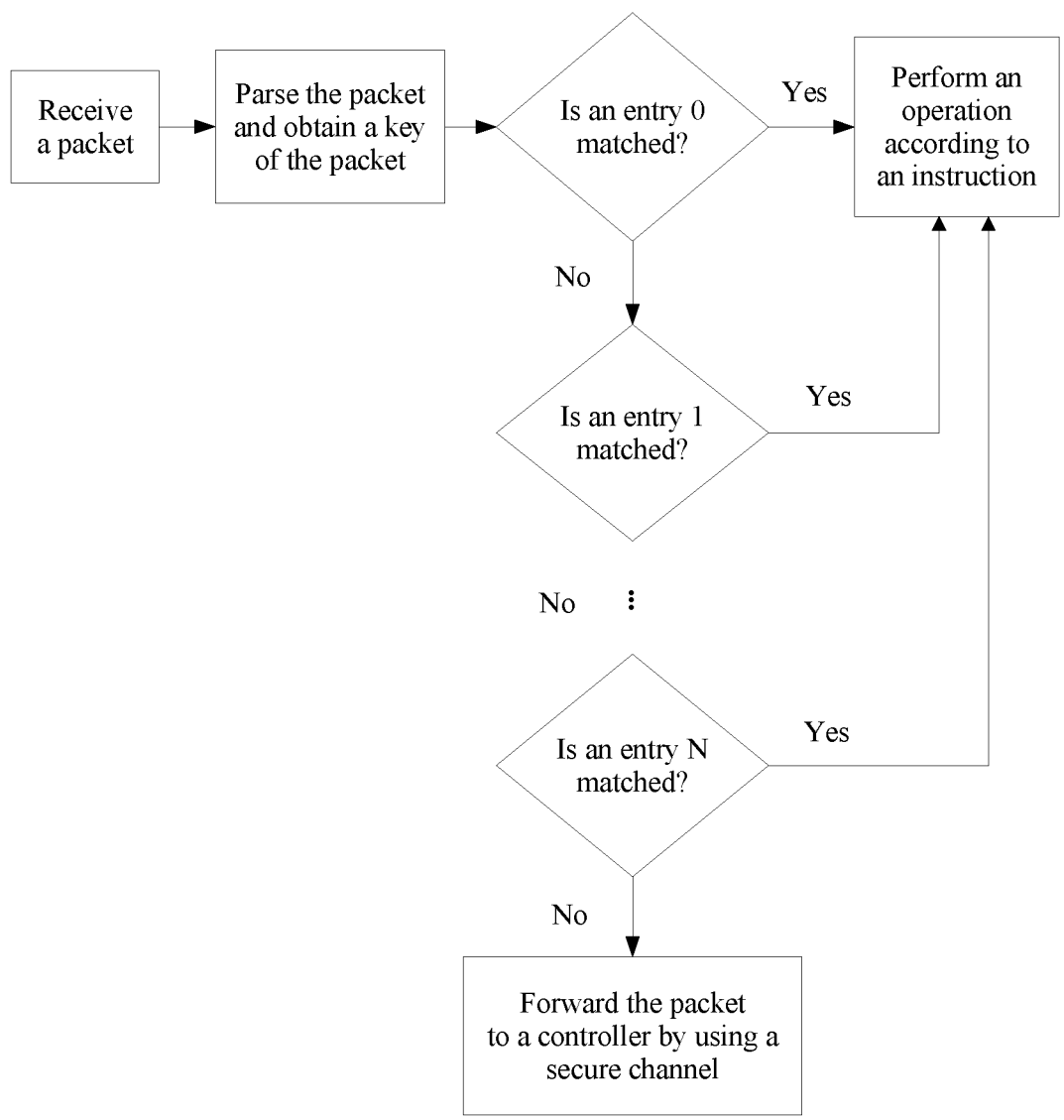
FIG. 1 is a schematic structural diagram of a procedure in which a packet processing apparatus processes a packet by using an OpenFlow technology.

The following clearly describes the technical solutions in the embodiments of the present invention with reference to the accompanying drawings in the embodiments of the present invention. Apparently, the described embodiments are merely some but not all of the embodiments of the present invention.

In the specification, claims, and accompanying drawings of the present invention, the terms "first", "second", "third", "fourth", and so on are intended to distinguish between different objects but do not limit a particular order. Moreover, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In this application, an instruction block is an instruction sequence. Specifically, the instruction sequence is a binary instruction sequence, and the binary instruction sequence may also be referred to as a codified instruction sequence. The codified instruction sequence may be obtained by using a symbolic instruction sequence or a symbolic statement sequence. The symbolic instruction sequence may be an instruction sequence described in an assembly language, and the symbolic statement sequence may be an instruction sequence described in a high-level programming language.

In this application, an instruction block defined by a vendor is an instruction block defined by a vendor of a packet processing apparatus. The packet processing apparatus may be a router or a network switch. The vendor of the packet processing apparatus may be Huawei or Cisco. The instruction block defined by the vendor may be a boot program. For example, after the router is powered on, the boot program needs to be loaded in a router initialization process. A user cannot modify, by using an application programming interface, the instruction block defined by the vendor.

In this application, an instruction block defined by a user is an instruction block defined by a user of a packet processing apparatus. The user of the packet processing apparatus may be an operator of a fixed network or an operator of a mobile network. For example, the fixed network may be an Ethernet or software-defined networking (SDN), and the operator of the fixed network may be China Mobile, France Telecom, or Deutsche Telekom.

For example, a compiled Protocol Oblivious Forwarding (POF) scenario includes a controller and an OpenFlow switch. The controller and the OpenFlow switch communicate with each other by using a control channel. The controller may include a front-end compiler, and the OpenFlow switch may include a back-end compiler. An engineer of China Mobile may edit a computer program by using the controller. For example, the controller includes an integrated development environment (IDE), and the IDE may include a code editor. In addition, the IDE may include a compiler, a debugger, and a graphical user interface (GUI). The user may provide input for the IDE by using a physical keyboard or a virtual keyboard. Specifically, the user may edit the computer program by using a high-level programming language, and the high-level programming language may be Java or C++. The compiler may compile the computer program described in the high-level programming language, so as to generate a computer program described in an assembly language. The controller may send, by using the control channel, the computer program described in the assembly language to the OpenFlow switch. Specifically, the controller may encapsulate, in an OpenFlow message, the computer program described in the assembly language, and send the OpenFlow message to the OpenFlow switch by using a southbound interface. After receiving the computer program described in the assembly language, the OpenFlow switch may compile, by using the back-end compiler, the computer program described in the assembly language into a microcode. The OpenFlow switch loads the microcode into a forwarding plane of the OpenFlow switch. After the OpenFlow switch receives a packet, the OpenFlow switch may process the packet according to the microcode. It may be understood that the microcode herein is an instruction block defined by the user. The user may also modify the microcode in the foregoing manner.

In this application, a table may be a routing table, a Media Access Control (MAC) protocol table, or an incoming label map (ILM) table.

In the following description, specific details such as a particular system structure, an interface, and a technology are set forth in an illustrative but not a restrictive sense to make a thorough understanding of the present invention. However, a person skilled in the art should know that the present invention may be practiced in other embodiments without these specific details. In other cases, detailed descriptions of well-known apparatuses, circuits, and methods are omitted, so that the present invention is described without being obscured by unnecessary details.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An SDN is a new network architecture. An OpenFlow technology may be used to implement the SDN.

In the OpenFlow technology, a pipeline including a multi-level flow table is used to perform packet forwarding processing. Specifically, a flow table includes multiple entries, and each entry is corresponding to one forwarding rule. The flow table includes a matching field, an instruction field, and a counter field. The matching field is used to match packets. The instruction field is used to describe a specific manner in which a packet is to be processed, and the specific processing manner includes: GOTO TABLE, drop, output, encapsulation, decapsulation, or the like.

As shown in FIG. 1, a procedure in which a packet processing apparatus processes a packet by using an OpenFlow technology may be as follows: When the packet processing apparatus receives a packet, the packet processing apparatus parses the packet and obtains a key of the packet. Then, the packet processing apparatus successively compares the key of the packet with entries in the flow table according to priorities of the entries in the flow table stored in the packet processing apparatus. Finally, the packet processing apparatus uses an entry that matches the key of the packet as a matching result, and operates the packet according to an instruction stored in the entry. In addition, once a specific entry in the flow table successfully matches the packet, a counter value in the entry is updated; or if the packet processing apparatus does not find, in the flow table, an entry that matches the packet, the packet processing apparatus forwards the packet to a controller by using a secure channel. The packet processing apparatus may be an OpenFlow switch.

A POF technology is an enhancement to the OpenFlow technology, and the technology may be an interpreted POF technology or a compiled POF technology. In the interpreted POF technology, an instruction is stored in an entry in a flow table. When a packet received by the packet processing apparatus matches a specific entry, the packet processing apparatus parses and executes an instruction stored in the entry. The instruction stored in the entry in the flow table may be an OpenFlow instruction (Instruction). The OpenFlow instruction may be used to implement an OpenFlow action (Action). For example, the action may be push-tag, pop-tag, drop, output, or group. For the OpenFlow instruction or the OpenFlow action, refer to OpenFlow Switch Specification version 1.4.0.

For the compiled POF technology, instead of being stored in an entry in a flow table, an instruction is stored, in a form of object code, in instruction storage space that is dynamically allocated. The instruction storage space may be located in a memory. The memory may be a static random access memory (SRAM). A storage address of the object code in the instruction storage space is stored in the entry in the flow table.

In the compiled POF technology, when processing a packet received by the packet processing apparatus, the packet processing apparatus completes packet forwarding processing according to a multi-level instruction block. The packet forwarding processing includes the following operations: The packet processing apparatus processes the packet according to an instruction block defined by a vendor of the apparatus; jumps from the instruction block defined by the vendor of the apparatus to a first level instruction block defined by a user, and processes the packet according to the first level instruction block defined by the user; and processes the packet according to an $N^{th}$ (N>1) level instruction block defined by the user, jumps from the $N^{th}$ level instruction block defined by the user to an $(N+1)^{th}$ level instruction block defined by the user, and processes the packet according to the $(N+1)^{th}$ level instruction block defined by the user.

The packet processing apparatus completes packet processing according to the multi-level instruction block. Specifically, the packet processing apparatus obtains a storage address of a next level instruction block of a current instruction block according to the current instruction block, and jumps from the current instruction block to the next level instruction block of the current instruction block according to the obtained storage address, so as to process the packet according to the next level instruction block.

The packet processing apparatus may obtain, from a flow table entry corresponding to the current instruction block, the storage address of the next level instruction block of the current instruction block. For example, the packet processing apparatus first obtains a search key of a packet according to an $N^{th}$ level instruction block, and obtains, from the $N^{th}$ level instruction block, an identifier of a flow table; then the packet processing apparatus searches the flow table indicated by the identifier of the flow table for a flow table entry that matches the search key of the packet; and finally the packet processing apparatus obtains, from the flow table entry that matches the search key of the packet, a storage address of an $(N+1)^{th}$ level instruction block. If a storage location of an $(N+1)^{th}$ level dynamic load instruction block changes, the packet processing apparatus needs to update content of an entry that includes a storage address of the $(N+1)^{th}$ level dynamic load instruction block and that is in a flow table stored in the packet processing apparatus. In this way, the packet processing apparatus can jump from an $N^{th}$ level dynamic load instruction block to the $(N+1)^{th}$ level dynamic load instruction block. Because the packet processing apparatus includes a relatively large quantity of flow table entries that include the storage address of the $(N+1)^{th}$ level dynamic load instruction block, the packet processing apparatus needs to update content of multiple entries, and overheads are relatively high.

In addition, if multiple instructions in an instruction block of each level include a storage address of a next level instruction block of the instruction block of each level, the packet processing apparatus obtains, from a current instruction block, a storage address of a next level instruction block of the current instruction block. Likewise, if a storage location of the $(N+1)^{th}$ level instruction block defined by the user changes, the packet processing apparatus also needs to update content of an instruction that includes a storage address of the $(N+1)^{th}$ level instruction block defined by the user and that is in the $N^{th}$ level instruction block defined by the user. Because the $N^{th}$ level instruction block defined by the user includes a relatively large quantity of instructions that include the storage address of the $(N+1)^{th}$ level instruction block defined by the user, the packet processing apparatus needs to update content of multiple instructions, and overheads are relatively high.

To resolve a problem that after a storage location of an instruction block changes, a packet processing apparatus needs to update multiple identifiers of the instruction block, and overheads are relatively high, embodiments of the present invention provide a packet processing method.

Various solutions described in the present invention are applied to an application scenario in which a packet is processed.

Preferably, solutions described in the present invention are applied to the compiled POF technology.

Embodiment 1

Figure 2:
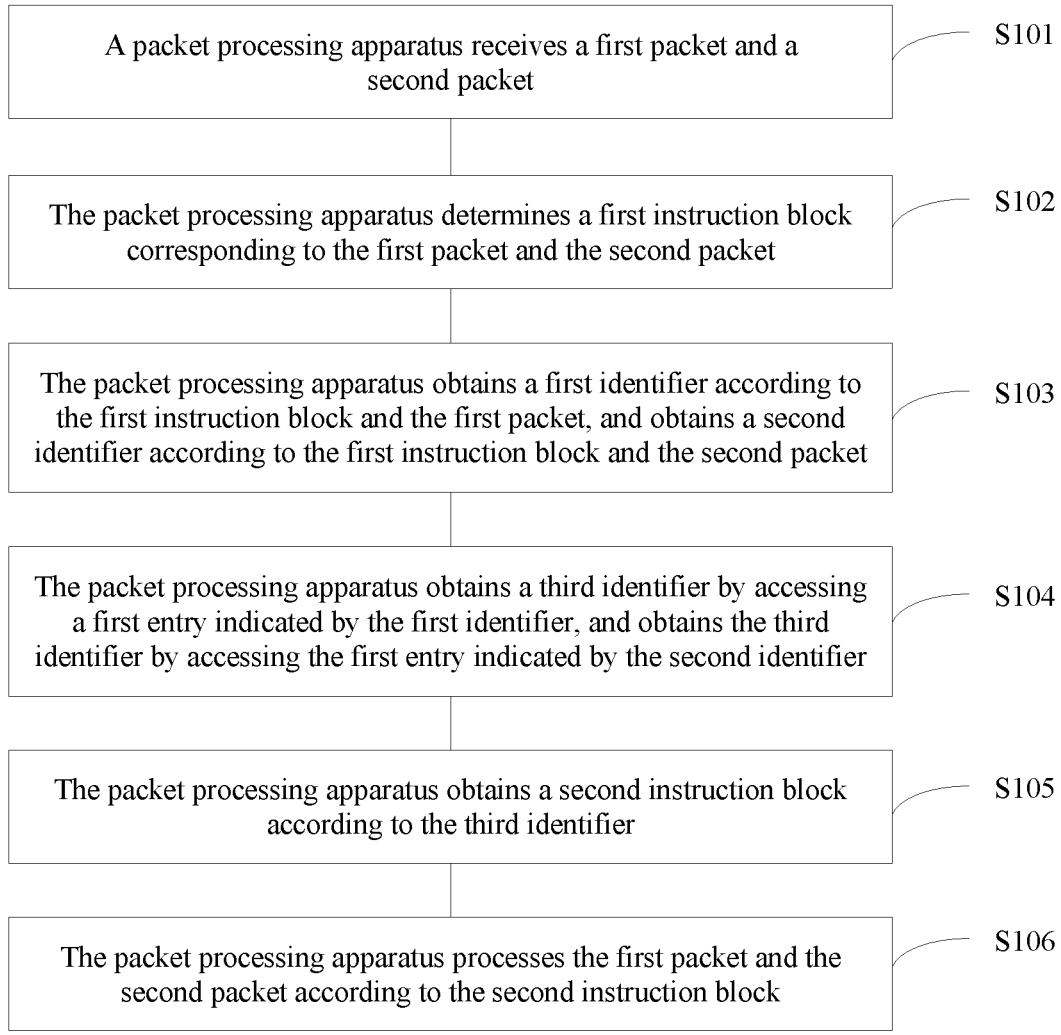
FIG. 2 is a schematic flowchart of a packet processing method according to an embodiment of the present invention.

An embodiment provides a packet processing method. As shown in FIG. 2, the method includes the following steps.

S101. A packet processing apparatus receives a first packet and a second packet.

S102. The packet processing apparatus determines a first instruction block corresponding to the first packet and the second packet.

S103. The packet processing apparatus obtains a first identifier according to the first instruction block and the first packet, and obtains a second identifier according to the first instruction block and the second packet.

The first identifier is used to indicate a first entry, the second identifier is used to indicate the first entry, the first entry includes a third identifier, and the third identifier is a storage address of a second instruction block.

S104. The packet processing apparatus obtains a third identifier by accessing a first entry indicated by the first identifier, and obtains the third identifier by accessing the first entry indicated by the second identifier.

S105. The packet processing apparatus obtains a second instruction block according to the third identifier.

S106. The packet processing apparatus processes the first packet and the second packet according to the second instruction block.

Specifically, the second instruction block is an instruction block defined by a user.

It should be noted that, in this embodiment of the present invention, processing performed by the packet processing apparatus on the first packet is independent of processing performed by the packet processing apparatus on the second packet. The packet processing apparatus may first process the first packet, and then process the second packet; or the packet processing apparatus may first process the second packet, and then process the first packet; or the packet processing apparatus may process the first packet and the second packet at the same time.

Specifically, S101 includes: receiving the first packet and receiving the second packet.

Optionally, the packet processing apparatus may first receive the first packet, and then receive the second packet; or the packet processing apparatus may first receive the second packet, and then receive the first packet.

S102 includes: determining the first instruction block corresponding to the first packet, and determining the first instruction block corresponding to the second packet.

Optionally, the packet processing apparatus may first determine the first instruction block corresponding to the first packet, and then receive the second packet; or the packet processing apparatus may first determine the first instruction block corresponding to the second packet, and then receive the first packet; or the packet processing apparatus may first receive the first packet and the second packet, and then determine the first instruction block corresponding to the first packet and the first instruction block corresponding to the second packet.

S103 includes: obtaining the first identifier according to the first packet, and obtaining the second identifier according to the second packet.

Specifically, the packet processing apparatus first determines the first instruction block corresponding to the first packet, and then obtains the first identifier according to the first packet. The packet processing apparatus first determines the first instruction block corresponding to the second packet, and then obtains the second identifier according to the second packet.

Optionally, the packet processing apparatus may first obtain the first identifier according to the first packet, and then receive the second packet; or the packet processing apparatus may first obtain the second identifier according to the second packet, and then receive the first packet.

S104 includes: obtaining, by the packet processing apparatus, the third identifier by accessing the first entry indicated by the first identifier, and obtaining, by the packet processing apparatus, the third identifier by accessing the first entry indicated by the second identifier.

Specifically, the packet processing apparatus first obtains the first identifier according to the first packet, and then obtains the third identifier by accessing the first entry indicated by the first identifier. The packet processing apparatus first obtains the second identifier according to the second packet, and then obtains the third identifier by accessing the first entry indicated by the second identifier.

Optionally, the packet processing apparatus may first obtain the third identifier by accessing the first entry indicated by the first identifier, and then receive the second packet; or the packet processing apparatus may first obtain the third identifier by accessing the first entry indicated by the second identifier, and then receive the first packet.

S105 includes: obtaining the second instruction block according to the third identifier.

Specifically, the obtaining a second instruction block may be triggered by the first packet, or may be triggered by the second packet.

In this embodiment of the present invention, packet processing is performed by the packet processing apparatus. The packet processing may be: forwarding a packet, dropping a packet, modifying a packet (for example, encapsulating or decapsulating the packet), performing a committed access rate (CAR) operation on a packet, or performing a counter operation on a packet. Specifically, the forwarding a packet may include: determining a search key, searching for a flow table entry, obtaining a storage address of a next level instruction block, and decreasing a value of a time to live (TTL) field by 1.

According to the packet processing method provided in this embodiment of the present invention, a forwarding service may be implemented by forwarding the packet. The forwarding service may be a layer 2 forwarding service, a layer 3 forwarding service, a layer 4 forwarding service, a Multiprotocol Label Switching (MPLS) forwarding service, or a virtual private network (VPN) forwarding service. The layer 2 forwarding service may be a MAC protocol forwarding service. The layer 3 forwarding service may be an Internet Protocol (IP) forwarding service. The layer 4 forwarding service may be a Transmission Control Protocol (TCP) forwarding service or a User Datagram Protocol (UDP) forwarding service. The VPN forwarding service may be a Layer 2 virtual private network (L2VPN) forwarding service or a Layer 3 virtual private network (L3VPN) forwarding service. A specific protocol packet may be processed in the forwarding service, for example, a MAC protocol packet may be processed in the MAC protocol forwarding service, an IP packet may be processed in the IP forwarding service, a TCP packet may be processed in the TCP forwarding service, and a UDP packet may be processed in the UDP forwarding service.

The packet processing apparatus may be a router, a network switch, a firewall, a load balancer, a wavelength division multiplexing device, a packet transport network device, a base station, a base station controller, or a data center. Specifically, the packet processing may be performed by a processor in the packet processing apparatus. The processor may be a network processor (NP) or a central processing unit (CPU).

The method shown in FIG. 2 is further described below with reference to specific embodiments.

The packet processing apparatus performs S101. S101 includes: receiving, by the packet processing apparatus, the first packet and the second packet.

The packet processing apparatus performs S102. S102 includes: determining, by the packet processing apparatus, the first instruction block corresponding to the first packet and the second packet.

Optionally, the packet processing apparatus may determine, according to a type of an interface on which the first packet and the second packet are received, the first instruction block corresponding to the first packet and the second packet.

In this embodiment of the present invention, an interface on which the packet processing apparatus receives the first packet and an interface on which the packet processing apparatus receives the second packet may be a same interface or may be different interfaces.

Optionally, an interface in the packet processing apparatus may be an Ethernet interface, a packet over synchronous digital hierarchy (Packet over SDH) interface, or an asynchronous transfer mode (ATM) interface.

In this embodiment of the present invention, the first packet and the second packet may be corresponding to a same protocol, or may be corresponding to different protocols. For example, the first packet may be an Internet Protocol (IP) packet, an Ethernet frame or a Multiprotocol Label Switching (MPLS) protocol packet, and the second packet may be an IP packet, an Ethernet frame, or an MPLS protocol packet.

Specifically, the packet processing apparatus pre-stores the first instruction block. The packet processing apparatus pre-stores a correspondence between a first interface and the first instruction block. The packet processing apparatus may implement the correspondence between the first interface and the first instruction block by using a linked list, a structure, a pointer, an array, or another data structure. If the packet processing apparatus receives the first packet and the second packet by using the first interface, the packet processing apparatus may determine, according to the pre-stored correspondence between the first interface and the first instruction block, the first instruction block corresponding to the first interface. In this scenario, the first instruction block is an instruction block defined by a vendor of the apparatus.

Optionally, the packet processing apparatus may determine, according to a previous level instruction block (that is, a third instruction block) of the first instruction block, the first instruction block corresponding to the first packet and the second packet. In this scenario, the first instruction block is an instruction block defined by a user.

Specifically, the packet processing apparatus obtains a fifth identifier according to the third instruction block, where the fifth identifier is used to indicate a second entry; accesses the second entry according to the fifth identifier, where the second entry includes a sixth identifier, and the sixth identifier is a storage address of the first instruction block; and determines the first instruction block according to the sixth identifier. In this application scenario, the first instruction block is the instruction block defined by the user.

The third instruction block may be an instruction block defined by a vendor of the apparatus, or may be an instruction block defined by a user. This is not specifically limited in this embodiment of the present invention.

For example, if the third instruction block is the instruction block defined by the vendor of the apparatus, the packet processing apparatus pre-stores the third instruction block. The packet processing apparatus pre-stores a correspondence between an interface on which a packet is received and the third instruction block. The packet processing apparatus may implement, by using a linked list, a structure, a pointer, an array, or another data structure, the correspondence between the interface on which the packet is received and the third instruction block. If the packet processing apparatus receives the first packet and the second packet by using the interface on which the packet is received, the packet processing apparatus may determine the third instruction block according to the pre-stored correspondence between the interface on which the packet is received and the third instruction block.

A method in which the packet processing apparatus determines, according to the second instruction block, the first instruction block corresponding to the second packet is the same as a method in which the packet processing apparatus determines, according to the second instruction block, the first instruction block corresponding to the first packet, and details are not described herein again.

It can be learned that, in this embodiment of the present invention, the first instruction block may be an instruction block defined by a vendor of the apparatus, or may be an instruction block defined by a user.

Further, after determining the first instruction block corresponding to the first packet and the second packet, the packet processing apparatus obtains the first identifier according to the first instruction block and the first packet, and obtains the second identifier according to the first instruction block and the second packet.

The packet processing apparatus performs S103. S103 includes: obtaining, by the packet processing apparatus, the first identifier according to the first instruction block and the first packet, and obtaining the second identifier according to the first instruction block and the second packet.

The first identifier is used to indicate the first entry, the second identifier is used to indicate the first entry, the first entry includes the third identifier, and the third identifier is the storage address of the second instruction block.

Optionally, the first identifier may be a sequence number of the first entry in a preset instruction mapping table, or may be a pointer of the first entry, or may be a name of an array (when the first entry is stored in the array), or may be a storage address of the first entry, or may be other information used to indicate the first entry, and no examples are given herein for description.

Likewise, the second identifier may be a sequence number of the first entry in a preset instruction mapping table, or may be a pointer of the first entry, or may be a name of an array (when the first entry is stored in the array), or may be a storage address of the first entry, or may be other information used to indicate the first entry, and no examples are given herein for description.

It should be noted that, in this embodiment of the present invention, the first identifier and the second identifier may be the same or may be different. This is not specifically limited in this embodiment of the present invention.

Optionally, in this embodiment of the present invention, a method in which the packet processing apparatus obtains the first identifier may be as follows: The packet processing apparatus obtains, from the first instruction block, a first jump instruction according to the first packet, and obtains the first identifier from the first jump instruction, where the first identifier is a storage address of the first entry, the first instruction block includes the first jump instruction, the first jump instruction includes an operation code and an operand, and the first identifier is the operand.

The first jump instruction may be goto(x), or may be jump(y), or may be another instruction statement used to indicate a jump. This is not specifically limited in this embodiment of the present invention. "goto" and "jump" are operation codes, and are used to indicate a jump. "x" and "y" are operands, and are used to indicate a destination identifier of the jump, where the destination identifier is the first identifier.

For example, it is assumed that the first instruction block includes a branch statement a, and the branch statement a includes a conditional statement a1 and an action statement a2. A variable in the conditional statement a1 is a specific field of the first packet or a function corresponding to a specific field of the first packet. The action statement a2 includes the first jump instruction jump(y), where y is the first identifier. The packet processing apparatus can obtain the first identifier y according to the first packet and the branch statement a.

Optionally, in this embodiment of the present invention, a method in which the packet processing apparatus obtains the first identifier may be as follows: The packet processing apparatus obtains, from the first packet, a search key according to the first instruction block; the packet processing apparatus obtains an identifier of a first flow table according to the first instruction block; the packet processing apparatus searches the first flow table indicated by the identifier of the first flow table for a flow table entry that matches the search key, where the flow table entry includes the first identifier; and the packet processing apparatus obtains the first identifier from the flow table entry.

Specifically, a method in which the packet processing apparatus obtains, from the first packet, the search key according to the first instruction block is as follows: The packet processing apparatus obtains, from the first instruction block, a location parameter of the search key, and obtains, from the first packet, the search key according to the location parameter of the search key.

The location parameter of the search key is used to indicate a location of the search key in the first packet.

In this embodiment of the present invention, the location parameter of the search key includes a first parameter and a second parameter. The first parameter is an offset value from a start bit of the search key to a first bit of a packet, and the second parameter is a length value of the search value; or the first parameter is an offset value from an end bit of the search key to a first bit of a packet, and the second parameter is a length value of the search key.

Optionally, a method in which the packet processing apparatus obtains the identifier of the first flow table according to the first instruction block may be as follows: The packet processing apparatus obtains, from the first instruction block, the identifier of the first flow table; or may be as follows: The packet processing apparatus obtains, from the first instruction block, an identifier of a preset flow table information table, accesses the preset flow table information table according to the identifier of the preset flow table information table, and obtains, from the preset flow table information table, the identifier of the first flow table. This is not specifically limited in this embodiment of the present invention.

Specifically, after the packet processing apparatus obtains the search key of the first packet and the identifier of the first flow table, the packet processing apparatus searches, according to the identifier of the first flow table, the first flow table indicated by the identifier of the first flow table for the flow table entry that matches the search key.

It should be noted that, in this embodiment of the present invention, a method in which the packet processing apparatus obtains the second identifier according to the first instruction block and the second packet is the same as a method in which the packet processing apparatus obtains the first identifier according to the first instruction block and the first packet, and details are not described herein again.

Further, after obtaining the first identifier used to indicate the first entry, the packet processing apparatus accesses the first entry according to the first identifier.

The packet processing apparatus performs S104. S104 includes: obtaining, by the packet processing apparatus, the third identifier by accessing the first entry indicated by the first identifier, and obtaining the third identifier by accessing the first entry indicated by the second identifier.

Preferably, the third identifier is indicated by an immediate, and the immediate represents the storage address of the second instruction block.

It should be noted that, in this embodiment of the present invention, the packet processing apparatus stores the third identifier in the first entry before receiving the first packet and the second packet. That is, the packet processing apparatus stores the third identifier in the first entry before performing S101.

Specifically, if the first identifier is the storage address of the first entry, the packet processing apparatus may perform an addressing operation by using the first identifier, so as to access the first entry. If the first identifier is the sequence number of the first entry in the preset instruction mapping table, the packet processing apparatus may access the first entry according to the sequence number.

Likewise, if the second identifier is the storage address of the first entry, the packet processing apparatus may perform an addressing operation by using the second identifier, so as to access the first entry. If the second identifier is the sequence number of the first entry in the preset instruction mapping table, the packet processing apparatus may access the first entry according to the sequence number.

Optionally, if the first instruction block includes the first jump instruction, the first jump instruction includes the operation code and the operand, and the first identifier is the operand, a method in which the packet processing apparatus obtains the third identifier by accessing the first entry indicated by the first identifier is as follows: The packet processing apparatus accesses the first entry by executing the first jump instruction, and obtains the third identifier from the first entry.

Optionally, in addition to the first identifier, if the flow table entry that matches the search key further includes an operation code used to indicate a jump, and the operation code and the first identifier form a second jump instruction, a method in which the packet processing apparatus obtains the third identifier by accessing the first entry indicated by the first identifier is as follows: The packet processing apparatus accesses the first entry by executing the second jump instruction in the flow table entry that matches the search key, and obtains the third identifier from the first entry.

Optionally, if the flow table entry that matches the search key includes only the first identifier, and the first instruction block includes an operation code corresponding to the first identifier, a method in which the packet processing apparatus obtains the third identifier by accessing the first entry indicated by the first identifier is as follows: The packet processing apparatus accesses the first entry according to the operation code corresponding to the first identifier and the first identifier that are in the first instruction block, and obtains the third identifier from the first entry.

Specifically, because the first entry includes the third identifier, when the packet processing apparatus accesses the first entry according to the first identifier, the packet processing apparatus can read the third identifier included in the first entry, and find the second instruction block according to the third identifier.

The third identifier is the storage address of the second instruction block. If a storage location of the second instruction block changes, the packet processing apparatus may update the third identifier. In this embodiment of the present invention, the first entry includes the third identifier. Therefore, if the storage location of the second instruction block changes, the packet processing apparatus only needs to update the third identifier in the first entry.

Specifically, when the packet processing apparatus deletes the second instruction block, the packet processing apparatus sets the third identifier in the first entry to be invalid.

Specifically, when the packet processing apparatus deletes the second instruction block, the packet processing apparatus deletes the third identifier in the first entry.

Specifically, when the storage location of the second instruction block is adjusted from a first location to a second location, the packet processing apparatus replaces the third identifier in the first entry with a fourth identifier, where the first location is corresponding to the third identifier, and the second location is corresponding to the fourth identifier. That is, the storage address that is of the second instruction block and that is represented by the third identifier is the first location, and the storage address that is of the second instruction block and that is represented by the fourth identifier is the second location.

Figure 3:
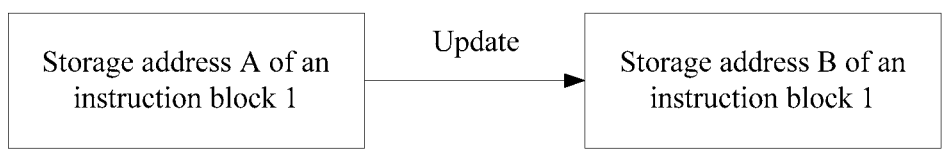
FIG. 3 is a schematic diagram of updating a third identifier according to an embodiment of the present invention.

For example, as shown in FIG. 3, the first entry includes a storage address A of an instruction block 1. If a storage location of the instruction block 1 is adjusted to B, the packet processing apparatus updates the "storage address A of the instruction block 1" in the first entry to a "storage address B of the instruction block 1".

Further, the packet processing apparatus obtains the second instruction block according to the third identifier, that is, the packet processing apparatus performs S105.

Specifically, the packet processing apparatus reads, from an instruction memory (IMEM) module in an SRAM in the packet processing apparatus, the second instruction block according to the third identifier, and stores the second instruction block in a register.

Further, the packet processing apparatus jumps from the first instruction block to the second instruction block according to the third identifier.

Optionally, if the first entry further includes an operation code used to indicate a jump, and the operation code and the third identifier form a third jump instruction, the packet processing apparatus jumps from the first instruction block to the second instruction block by executing the third jump instruction.

Optionally, if the first entry includes only the third identifier, and the first instruction block includes an operation code corresponding to the third identifier, the packet processing apparatus jumps from the first instruction block to the second instruction block according to the operation code corresponding to the third identifier and the third identifier that are in the first instruction block.

After obtaining the second instruction block, the packet processing apparatus processes the first packet and the second packet according to the second instruction block.

The packet processing apparatus performs S106. S106 includes: processing, by the packet processing apparatus, the first packet and the second packet according to the second instruction block.

Specifically, the packet processing apparatus forwards, in the register, the first packet and the second packet according to the second instruction block, or drops the first packet and the second packet, or modifies the first packet and the second packet, or performs a committed access rate operation on the first packet and the second packet, or performs a counter operation on the first packet and the second packet.

In this solution, a packet processing apparatus accesses a first entry according to a first identifier, and accesses the first entry according to a second identifier. The first entry includes a third identifier, and the third identifier is a storage address of a second instruction block; that is, the storage address of the second instruction block is stored in the first entry. Therefore, the packet processing apparatus can obtain the second instruction block according to the third identifier, and process a first packet and a second packet according to the second instruction block. If a storage location of the second instruction block changes, the packet processing apparatus needs to update only the third identifier stored in the first entry to obtain the second instruction block whose storage location has changed. In the conventional art, the packet processing apparatus stores multiple identifiers, and the multiple identifiers are all used to identify a same instruction block. When a storage location of the same instruction block changes, the packet processing apparatus needs to update the multiple identifiers. Therefore, in the foregoing technical solution, the packet processing apparatus needs to update the third identifier in the first entry instead of updating the multiple identifiers, so as to help reduce overheads and improve update efficiency.

In addition, in this embodiment of the present invention, the first instruction block may be an instruction block defined by a vendor of the apparatus.

In the conventional art, a storage address of a first level instruction block defined by the user is stored in a flow table entry corresponding to the instruction block defined by the vendor of the apparatus. Because the instruction block defined by the vendor of the apparatus is a program that cannot be modified in the packet processing apparatus, and content of a flow table corresponding to the instruction block defined by the vendor of the apparatus cannot be modified, the storage address that is of the first level instruction block defined by the user and that is stored in the flow table entry corresponding to the instruction block defined by the vendor of the apparatus cannot be modified. Therefore, if a storage location of the first level instruction block defined by the user changes, the packet processing apparatus cannot access, according to the storage address that is of the first level instruction block defined by the user and that is stored in the flow table entry corresponding to the instruction block defined by the vendor of the apparatus, the first level instruction block that is defined by the user and whose storage location changes.

In the conventional art, a storage address of a first level instruction block defined by the user is stored in the instruction block defined by the vendor of the apparatus. Because the instruction block defined by the vendor of the apparatus is a program that cannot be modified in the packet processing apparatus, the storage address that is of the first level instruction block defined by the user and that is stored in the instruction block defined by the vendor of the apparatus cannot be modified. Therefore, if a storage location of the first level instruction block defined by the user changes, the packet processing apparatus cannot access, according to the storage address that is of the first level instruction block defined by the user and that is stored in the instruction block defined by the vendor of the apparatus, the first level instruction block that is defined by the user and whose storage location changes.

In this embodiment of the present invention, if the first instruction block is the instruction block defined by the vendor of the apparatus, the second instruction block may be the first level instruction block defined by the user. The first identifier obtained by the packet processing apparatus according to the instruction block defined by the vendor of the apparatus is used to indicate the first entry. The first entry includes the third identifier used to indicate the storage address of the first level instruction block defined by the user. Therefore, after obtaining the third identifier according to the instruction block defined by the vendor of the apparatus, the packet processing apparatus can obtain, by accessing the first entry indicated by the third identifier, the storage address of the first level instruction block defined by the user, and process a packet according to the first level instruction block defined by the user.

Further, if the storage location of the first level instruction block defined by the user is adjusted from the first location to the second location, the packet processing apparatus may replace the third identifier in the first entry with the fourth identifier. In this way, the packet processing apparatus can implement a jump from the instruction block defined by the vendor of the apparatus to the first level instruction block defined by the user. The first location is corresponding to the third identifier, and the second location is corresponding to the fourth identifier.

Embodiment 2

An embodiment of the present invention provides a packet processing apparatus 1. The packet processing apparatus 1 may be configured to perform the method shown in FIG. 2. For details about implementation of the packet processing apparatus 1, refer to description of the embodiment corresponding to FIG. 2.

Figure 4:
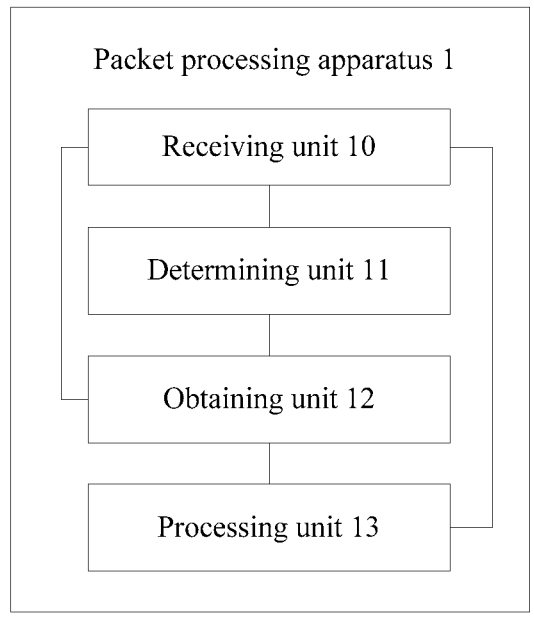
FIG. 4 is a first schematic structural diagram of a packet processing apparatus according to an embodiment of the present invention.

As shown in FIG. 4, the packet processing apparatus 1 includes a receiving unit 10, a determining unit 11, an obtaining unit 12, and a processing unit 13.

The receiving unit 10 is configured to receive a first packet and a second packet.

The determining unit 11 is configured to determine a first instruction block corresponding to the first packet and the second packet that are received by the receiving unit 10.

The obtaining unit 12 is configured to: obtain a first identifier according to the first instruction block determined by the determining unit 11 and the first packet received by the receiving unit 10, and obtain a second identifier according to the first instruction block determined by the determining unit 11 and the second packet received by the receiving unit 10, where the first identifier is used to indicate a first entry, the second identifier is used to indicate the first entry, the first entry includes a third identifier, and the third identifier is a storage address of a second instruction block.

Specifically, the second instruction block is an instruction block defined by a user.

The obtaining unit 12 is further configured to: obtain the third identifier by accessing the first entry indicated by the first identifier, and obtain the third identifier by accessing the first entry indicated by the second identifier.

The obtaining unit 12 is further configured to obtain the second instruction block according to the third identifier.

The processing unit 13 is configured to process, according to the second instruction block obtained by the obtaining unit 12, the first packet and the second packet that are received by the receiving unit 10.

The receiving unit 10 may be configured to perform S101.

The determining unit 11 may be configured to perform S102.

The obtaining unit 12 may be configured to perform S103, S104, and S105.

The processing unit 13 may be configured to perform S106.

Further, the obtaining unit 12 is configured to:

obtain, from the first instruction block determined by the determining unit 11, a first jump instruction according to the first packet received by the receiving unit 10, where the first identifier is a storage address of the first entry, the first instruction block includes the first jump instruction, the first jump instruction includes an operation code and an operand, and the first identifier is the operand;

access the first entry by executing the first jump instruction; and obtain the third identifier from the first entry.

Further, the obtaining unit 12 is configured to:

obtain, from the first packet, a search key according to the first instruction block;

obtain an identifier of a first flow table according to the first instruction block;

search the first flow table indicated by the identifier of the first flow table for a flow table entry that matches the search key, where the flow table entry includes the first identifier; and obtain the first identifier from the flow table entry.

Further, the processing unit 13 is further configured to:

delete the second instruction block;

set the third identifier in the first entry to be invalid; and delete the third identifier in the first entry; or when a storage location of the second instruction block is adjusted from a first location to a second location, replace the third identifier in the first entry with a fourth identifier, where the first location is corresponding to the third identifier, and the second location is corresponding to the fourth identifier.

Further, the first instruction block is an instruction block defined by a user.

The obtaining unit 12 is further configured to:

before the determining unit 11 determines the first instruction block corresponding to the first packet, obtain a fifth identifier according to a third instruction block, where the fifth identifier is used to indicate a second entry; and access the second entry according to the fifth identifier, where the second entry includes a sixth identifier, and the sixth identifier is a storage address of the first instruction block.

Further, the determining unit 11 is further configured to determine the first instruction block according to the sixth identifier in the second entry accessed by the obtaining unit 12.

Embodiment 3

Figure 5:
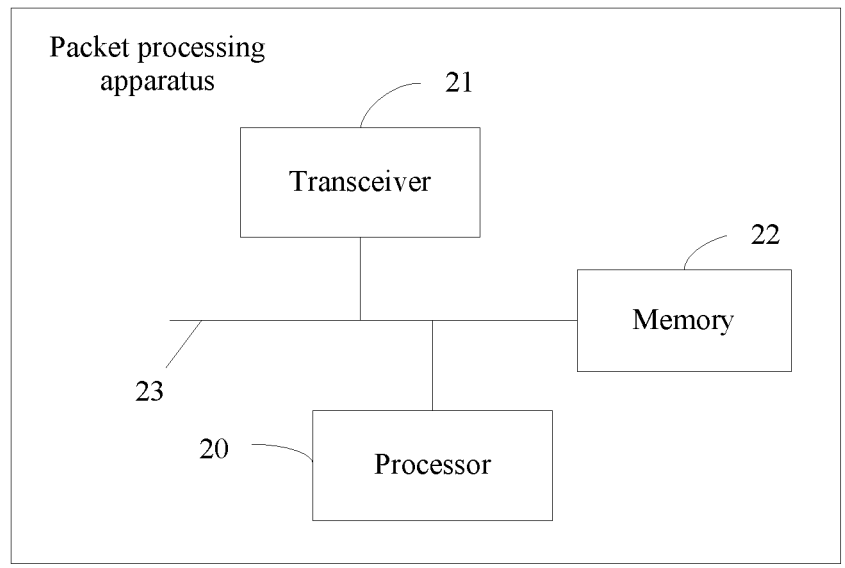
FIG. 5 is a second schematic structural diagram of a packet processing apparatus according to an embodiment of the present invention.

An embodiment of the present invention provides a packet processing apparatus. The packet processing apparatus in FIG. 5 may be configured to implement the packet processing apparatus 1 shown in FIG. 4. As shown in FIG. 5, the packet processing apparatus includes a processor 20, a transceiver 21, a memory 22, and a system bus 23.

The processor 20, the transceiver 21, and the memory 22 are connected to each other by using the system bus 23.

The processor 20 may be a single-core or multi-core central processing unit, or an application-specific integrated circuit, or one or more integrated circuits configured to implement this embodiment of the present invention.

The memory 22 may be a RAM, or may be a non-volatile memory. For example, the memory 22 may be a disk memory. The memory 22 is configured to store a third identifier in a first entry, where the third identifier is a storage address of a second instruction block.

Specifically, the memory 22 stores a computer program. The processor 20 may perform the method shown in FIG. 2 by accessing the computer program in the memory 22.

Specifically, the transceiver 21 may be configured to perform S101. The processor 20 may perform S102 to S106. When performing S102 to S106, the processor 20 may obtain a first packet and a second packet from the transceiver 21.

In this embodiment of the present invention, the packet processing apparatus may be a network device. Specifically, the network device may be a router, a network switch, a firewall, a packet transport network, or a data center. This is not specifically limited in this embodiment of the present invention.

Specifically, the transceiver 21 is configured to receive a first packet and a second packet.

Specifically, the processor 20 is configured to:

determine a first instruction block corresponding to the first packet and the second packet that are received by the transceiver 21;

obtain a first identifier according to the first instruction block and the first packet, and obtain a second identifier according to the first instruction block and the second packet, where the first identifier is used to indicate a first entry, the second identifier is used to indicate the first entry, the first entry includes a third identifier, and the third identifier is a storage address of a second instruction block;

obtain the third identifier by accessing the first entry indicated by the first identifier, and obtain the third identifier by accessing the first entry indicated by the second identifier;

obtain the second instruction block according to the third identifier; and process the first packet and the second packet according to the second instruction block.

Further, the processor 20 is configured to:

obtain, from the first instruction block, a first jump instruction according to the first packet received by the transceiver 21, where the first identifier is a storage address of the first entry, the first instruction block includes the first jump instruction, the first jump instruction includes an operation code and an operand, and the first identifier is the operand;

access the first entry by executing the first jump instruction; and obtain the third identifier from the first entry.

Further, the processor 20 is configured to:

obtain, from the first packet, a search key according to the first instruction block;

obtain an identifier of a first flow table according to the first instruction block;

search the first flow table indicated by the identifier of the first flow table for a flow table entry that matches the search key, where the flow table entry includes the first identifier; and obtain the first identifier from the flow table entry.

Further, the processor 20 is further configured to:

delete the second instruction block;

set the third identifier in the first entry to be invalid; and delete the third identifier in the first entry; or when a storage location of the second instruction block is adjusted from a first location to a second location, replace the third identifier in the first entry with a fourth identifier, where the first location is corresponding to the third identifier, and the second location is corresponding to the fourth identifier.

Further, the first instruction block is an instruction block defined by a user.

The processor 20 is further configured to:

before the first instruction block corresponding to the first packet is determined, obtain a fifth identifier according to a third instruction block, where the fifth identifier is used to indicate a second entry;

access the second entry according to the fifth identifier, where the second entry includes a sixth identifier, and the sixth identifier is a storage address of the first instruction block; and determine the first instruction block according to the sixth identifier.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet processing method comprising:
   receiving, by a packet processing apparatus, a packet;
   determining, by the packet processing apparatus, a first instruction block associated with the packet;
   obtaining, by the packet processing apparatus and from the first instruction block, a jump instruction according to the packet,
   wherein the jump instruction comprises an operation code and an operand;
   obtaining, by the packet processing apparatus, a first identifier according to the first instruction block and the packet,
      wherein the first identifier is the operand,
      wherein the first identifier is a storage address of a first entry,
      wherein the first entry comprises a third identifier, and
      wherein the third identifier is a storage address of a second instruction block;
   accessing, by the packet processing apparatus, the first entry by executing the jump instruction;
   obtaining, by the packet processing apparatus, the third identifier by accessing the first entry indicated by the first identifier;
   obtaining, by the packet processing apparatus, the second instruction block according to the third identifier; and
   processing, by the packet processing apparatus, the packet according to the second instruction block.

2. The packet processing method according to claim 1, wherein obtaining the first identifier according to the first instruction block and the packet comprises:
   obtaining, by the packet processing apparatus and from the packet, a search key according to the first instruction block;
   obtaining, by the packet processing apparatus, an identifier of a flow table according to the first instruction block;
   searching, by the packet processing apparatus, the flow table indicated by the identifier of the flow table for a flow table entry that matches the search key, wherein the flow table entry comprises the first identifier; and
   obtaining, by the packet processing apparatus, the first identifier from the flow table entry.

3. The packet processing method according to claim 1, further comprising:
   deleting, by the packet processing apparatus, the second instruction block;
   setting, by the packet processing apparatus, the third identifier in the first entry to be invalid; and
   deleting, by the packet processing apparatus, the third identifier in the first entry.

4. The packet processing method according to claim 1, further comprising:
   replacing, by the packet processing apparatus, the third identifier in the first entry with a fourth identifier in response to a storage location of the second instruction block being adjusted from a first location to a second location, wherein the first location is associated with the third identifier, and the second location is associated with the fourth identifier.

5. The packet processing method according to claim 1, wherein the first instruction block is an instruction block defined by a user, and before determining the first instruction block associated with the packet, the method further comprises:
   obtaining, by the packet processing apparatus, a fifth identifier according to a third instruction block, wherein the fifth identifier is used to indicate a second entry;
   accessing, by the packet processing apparatus, the second entry according to the fifth identifier, wherein the second entry comprises a sixth identifier, and the sixth identifier is a storage address of the first instruction block; and
   wherein determining the first instruction block associated with the packet comprises: determining, by the packet processing apparatus, the first instruction block according to the sixth identifier in the second entry.

6. A packet processing apparatus comprising:
   a processor;
   a receiver configured to cooperate with the processor to receive a packet; and
   the processor configured to:
      determine a first instruction block associated with the packet,
         wherein the first instruction block comprises a jump instruction, and wherein the jump instruction comprises an operation code and an operand;
obtain a first identifier according to the first instruction block and the packet,
wherein the first identifier is a storage address of a first entry,
wherein the first identifier is the operand,
wherein the first entry comprises a third identifier, and
wherein the third identifier is a storage address of a second instruction block;
access the first entry by executing the jump instruction;
obtain the third identifier by accessing the first entry indicated by the first identifier;
obtain the second instruction block according to the third identifier; and
process the packet according to the second instruction block.

7. The packet processing apparatus according to claim 6, wherein the processor is further configured to:
obtain, from the packet, a search key according to the first instruction block;
obtain an identifier of a flow table according to the first instruction block;
search the flow table indicated by the identifier of the flow table for a flow table entry that matches the search key, wherein the flow table entry comprises the first identifier; and
obtain the first identifier from the flow table entry.

8. The packet processing apparatus according to claim 6, wherein the processor is further configured to:
delete the second instruction block;
set the third identifier in the first entry to be invalid; and
delete the third identifier in the first entry.

9. The packet processing apparatus according to claim 6, wherein the processor is further configured to:
replace the third identifier in the first entry with a fourth identifier in response to a storage location of the second instruction block being adjusted from a first location to a second location, wherein the first location is associated with the third identifier, and the second location is associated with the fourth identifier.

10. The packet processing apparatus according to claim 6, wherein the first instruction block is an instruction block defined by a user;
the processor is further configured to:
before determining the first instruction block associated with the packet, obtain a fifth identifier according to a third instruction block, wherein the fifth identifier is used to indicate a second entry;
access the second entry according to the fifth identifier, wherein the second entry comprises a sixth identifier, and the sixth identifier is a storage address of the first instruction block; and
determine the first instruction block according to the sixth identifier in the second entry.

11. A packet processing method comprising:
receiving, by a packet processing apparatus, a packet;
determining, by the packet processing apparatus, a first instruction block associated with the packet;
obtaining, by the packet processing apparatus, a first identifier according to the first instruction block and the packet;
wherein the first identifier is used to indicate a first entry,
wherein the first entry comprises a third identifier, and
wherein the third identifier is a storage address of a second instruction block;
obtaining, by the packet processing apparatus, the third identifier by accessing the first entry indicated by the first identifier;
obtaining, by the packet processing apparatus, a fifth identifier according to a third instruction block,
wherein the fifth identifier is used to indicate a second entry,
wherein the second entry comprises a sixth identifier that is a storage address of the first instruction block, and
wherein determining the first instruction block associated with the packet is according to the sixth identifier in the second entry;
accessing, by the packet processing apparatus, the second entry according to the fifth identifier;
obtaining, by the packet processing apparatus, the second instruction block according to the third identifier; and
processing, by the packet processing apparatus, the packet according to the second instruction block.

12. The packet processing method according to claim 11, wherein obtaining the first identifier according to the first instruction block and the packet comprises:
obtaining, by the packet processing apparatus and from the first instruction block, a jump instruction according to the packet,
wherein the first instruction block comprises the jump instruction,
wherein the jump instruction comprises an operation code and an operand, and the first identifier is the operand,
wherein the first identifier is a storage address of the first entry; and
wherein obtaining the third identifier by accessing the first entry indicated by the first identifier comprises:
accessing, by the packet processing apparatus, the first entry by executing the jump instruction; and
obtaining, by the packet processing apparatus, the third identifier from the first entry.

13. The packet processing method according to claim 11, wherein obtaining the first identifier according to the first instruction block and the packet comprises:
obtaining, by the packet processing apparatus and from the packet, a search key according to the first instruction block;
obtaining, by the packet processing apparatus, an identifier of a flow table according to the first instruction block;
searching, by the packet processing apparatus, the flow table indicated by the identifier of the flow table for a flow table entry that matches the search key, wherein the flow table entry comprises the first identifier; and
obtaining, by the packet processing apparatus, the first identifier from the flow table entry.

14. The packet processing method according to claim 11, further comprising:
deleting, by the packet processing apparatus, the second instruction block;
setting, by the packet processing apparatus, the third identifier in the first entry to be invalid; and
deleting, by the packet processing apparatus, the third identifier in the first entry.

15. The packet processing method according to claim 11, further comprising:
replacing, by the packet processing apparatus, the third identifier in the first entry with a fourth identifier in response to a storage location of the second instruction block being adjusted from a first location to a second location, wherein the first location is associated with the third identifier, and the second location is associated with the fourth identifier.

* * * * *